(12) United States Patent
Chakraborty

(10) Patent No.: US 11,301,870 B2
(45) Date of Patent: Apr. 12, 2022

(54) METHOD AND APPARATUS FOR FACILITATING TURN-BASED INTERACTIONS BETWEEN AGENTS AND CUSTOMERS OF AN ENTERPRISE

(71) Applicant: [24]7.ai, Inc., San Jose, CA (US)

(72) Inventor: Abir Chakraborty, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 670 days.

(21) Appl. No.: 16/274,845

(22) Filed: Feb. 13, 2019

(65) Prior Publication Data

US 2019/0259036 A1  Aug. 22, 2019

Related U.S. Application Data

(60) Provisional application No. 62/633,004, filed on Feb. 20, 2018.

(51) Int. Cl.
| | |
|---|---|
| *G06Q 30/00* | (2012.01) |
| *G06N 3/04* | (2006.01) |
| *G06K 9/34* | (2006.01) |
| *H04L 51/00* | (2022.01) |
| *H04L 51/046* | (2022.01) |

(52) U.S. Cl.
CPC .......... *G06Q 30/016* (2013.01); *G06K 9/344* (2013.01); *G06N 3/0454* (2013.01); *H04L 51/046* (2013.01); *H04L 51/16* (2013.01)

(58) Field of Classification Search
CPC ...... G06Q 30/16; G06K 9/344; G06N 3/0454; H04L 51/046; H04L 51/16
See application file for complete search history.

(56) References Cited

U.S. PATENT DOCUMENTS

| | | | | |
|---|---|---|---|---|
| 8,917,764 | B2* | 12/2014 | Gupta | G06T 7/215 |
| | | | | 375/240.02 |
| 9,715,496 | B1* | 7/2017 | Sapoznik | G10L 15/26 |
| 10,452,783 | B2* | 10/2019 | Pasupalak | G06F 16/9535 |
| 10,515,155 | B2* | 12/2019 | Bachrach | G06N 3/0454 |
| 10,580,176 | B2* | 3/2020 | He | G06N 20/00 |
| 10,601,740 | B1* | 3/2020 | Harding | H04L 51/04 |
| 2010/0008581 | A1 | 1/2010 | Bressan | |
| 2014/0237057 | A1 | 8/2014 | Khodorenko | |

(Continued)

*Primary Examiner* — Sargon N Nano
(74) *Attorney, Agent, or Firm* — Perkins Coie LLP; Michael Glenn

(57) ABSTRACT

A method and apparatus for facilitating a turn-based interaction between a virtual agent and a customer of an enterprise are disclosed. The method includes receiving a conversational input provided by the customer during a turn-based interaction between the customer and the agent. One or more conversational inputs exchanged between the customer and the agent prior to the customer's conversational input are identified by positioning a virtual bounding box of fixed width over textual representation of the turn-based interaction. The conversational input and the one or more conversational inputs configure a set of conversational inputs. At least one context vector representation is generated based on an encoding of the set of conversational inputs. Each word of a virtual agent reply is predicted based on the at least one context vector representation. The virtual agent reply is provided to the customer in response to the conversational input of the customer.

20 Claims, 8 Drawing Sheets

(56) References Cited

U.S. PATENT DOCUMENTS

| | | | |
|---|---|---|---|
| 2015/0142704 A1* | 5/2015 | London | G06F 40/58 |
| | | | 706/11 |
| 2015/0185996 A1* | 7/2015 | Brown | G06F 3/04842 |
| | | | 715/706 |
| 2015/0365527 A1 | 12/2015 | Chakravarthy et al. | |
| 2016/0275582 A1 | 9/2016 | Zuverink et al. | |
| 2017/0148073 A1* | 5/2017 | Nomula | G06Q 30/0617 |
| 2018/0013699 A1 | 1/2018 | Sapoznik et al. | |
| 2018/0025085 A1* | 1/2018 | Sarangi | H04L 67/02 |
| | | | 707/722 |
| 2019/0132451 A1* | 5/2019 | Kannan | H04M 3/5235 |
| 2019/0385051 A1* | 12/2019 | Wabgaonkar | G06N 3/084 |
| 2020/0106881 A1* | 4/2020 | Beaver | H04M 3/5183 |

* cited by examiner

METHOD AND APPARATUS FOR FACILITATING TURN-BASED INTERACTIONS BETWEEN AGENTS AND CUSTOMERS OF AN ENTERPRISE

CROSS REFERENCE TO RELATED APPLICATIONS

This application claims priority to U.S. provisional patent application Ser. No. 62/633,004, filed Feb. 20, 2018, which is incorporated herein in its entirety by this reference thereto.

TECHNICAL FIELD

The invention generally relates to improving customer interaction experiences, and more particularly to a method and apparatus for facilitating turn-based interactions between agents and customers of an enterprise.

BACKGROUND

Typically, a customer may wish to converse with a customer support representative of an enterprise to enquire about products/services of interest, to resolve concerns, to make payments, to lodge complaints, and the like. To serve such a purpose, the enterprises may deploy both, human and automated conversational agents to interact with the customers and provide them with desired assistance.

The automated conversational agents, also referred to herein as virtual agents, may use natural language processing (NLP) algorithms and special grammar to interpret customer's natural language inputs, whether provided in a spoken form or a textual form, and respond appropriately.

Currently, in a turn-based interaction, i.e. an interaction where the customer and agent take turns in conversing with each other, each customer input is analyzed to provide a trained response to the customer. Each trained response is identified from among several trained responses based on the current customer input. The trained responses identified in such a manner fail to take into account a context of the conversation and, as such, a quality of responses provided to the customer is sub-optimal and this may degrade a quality of an interaction experience afforded to the customer.

There is need to take into account a context of the conversation while providing a reply to each input of the customer. Moreover, it is desirable to predict each word in a virtual agent reply based on the context of the conversation instead of providing trained replies to the customers of the enterprise.

SUMMARY

In an embodiment of the invention, a computer-implemented method for facilitating a turn-based interaction between an agent and a customer is disclosed. The method receives, by a processor, a conversational input provided by the customer during the turn-based interaction between the customer and the agent. The method identifies, by the processor, one or more conversational inputs exchanged between the customer and the agent prior to the conversational input provided by the customer. The one or more conversational inputs are identified by positioning a virtual bounding box of fixed width over textual representation of the turn-based interaction to capture a predefined number of conversational inputs within boundaries of the virtual bounding box. The virtual bounding box is positioned to capture the conversational input of the customer as a last conversational input in the virtual bounding box to facilitate identification of the one or more conversational inputs exchanged between the customer and the agent prior to the conversational input. The conversational input and the one or more conversational inputs configure a set of conversational inputs. The method generates, by the processor, at least one context vector representation based on an encoding of the set of conversational inputs. The at least one context vector representation is configured to capture a context of the conversational input. The method predicts, by the processor, each word of a virtual agent reply based on the at least one context vector representation. The virtual agent reply is provided to the customer in response to the conversational input of the customer.

In an embodiment, an apparatus for facilitating turn-based interactions between agents and customers is disclosed. The apparatus includes a processor and a memory. The memory stores instructions. The processor is configured to execute the instructions and thereby cause the apparatus to receive a conversational input provided by a customer during a turn-based interaction between the customer and an agent. The apparatus identifies one or more conversational inputs exchanged between the customer and the agent prior to the conversational input provided by the customer. The one or more conversational inputs are identified by positioning a virtual bounding box of fixed width over textual representation of the turn-based interaction to capture a predefined number of conversational inputs within boundaries of the virtual bounding box. The virtual bounding box is positioned to capture the conversational input of the customer as a last conversational input in the virtual bounding box to facilitate the identification of the one or more conversational inputs exchanged between the customer and the agent prior to the conversational input. The conversational input and the one or more conversational inputs configure a set of conversational inputs. The apparatus generates at least one context vector representation based on an encoding of the set of conversational inputs. The at least one context vector representation is configured to capture a context of the conversational input. The apparatus predicts each word of a virtual agent reply based on the at least one context vector representation. The virtual agent reply is provided to the customer in response to the conversational input of the customer.

In an embodiment of the invention, another computer-implemented method for facilitating a turn-based interaction between a virtual agent and a customer is disclosed. The method receives, by a processor, a conversational input provided by the customer during the turn-based interaction between the customer and the virtual agent. The method identifies, by the processor, one or more conversational inputs from the turn-based interaction based on a predefined criterion. The one or more conversational inputs are exchanged between the customer and the virtual agent prior to the conversational input provided by the customer. The conversational input and the one or more conversational inputs configure a set of conversational inputs. The method generates, by the processor, at least one context vector representation based on an encoding of the set of conversational inputs using a recurrent neural network (RNN) based encoder. The at least one context vector representation is configured to capture a context of the conversational input. The method predicts, by the processor, each word of a virtual agent reply based on the at least one context vector representation. The virtual agent reply is provided to the customer in response to the conversational input of the customer.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
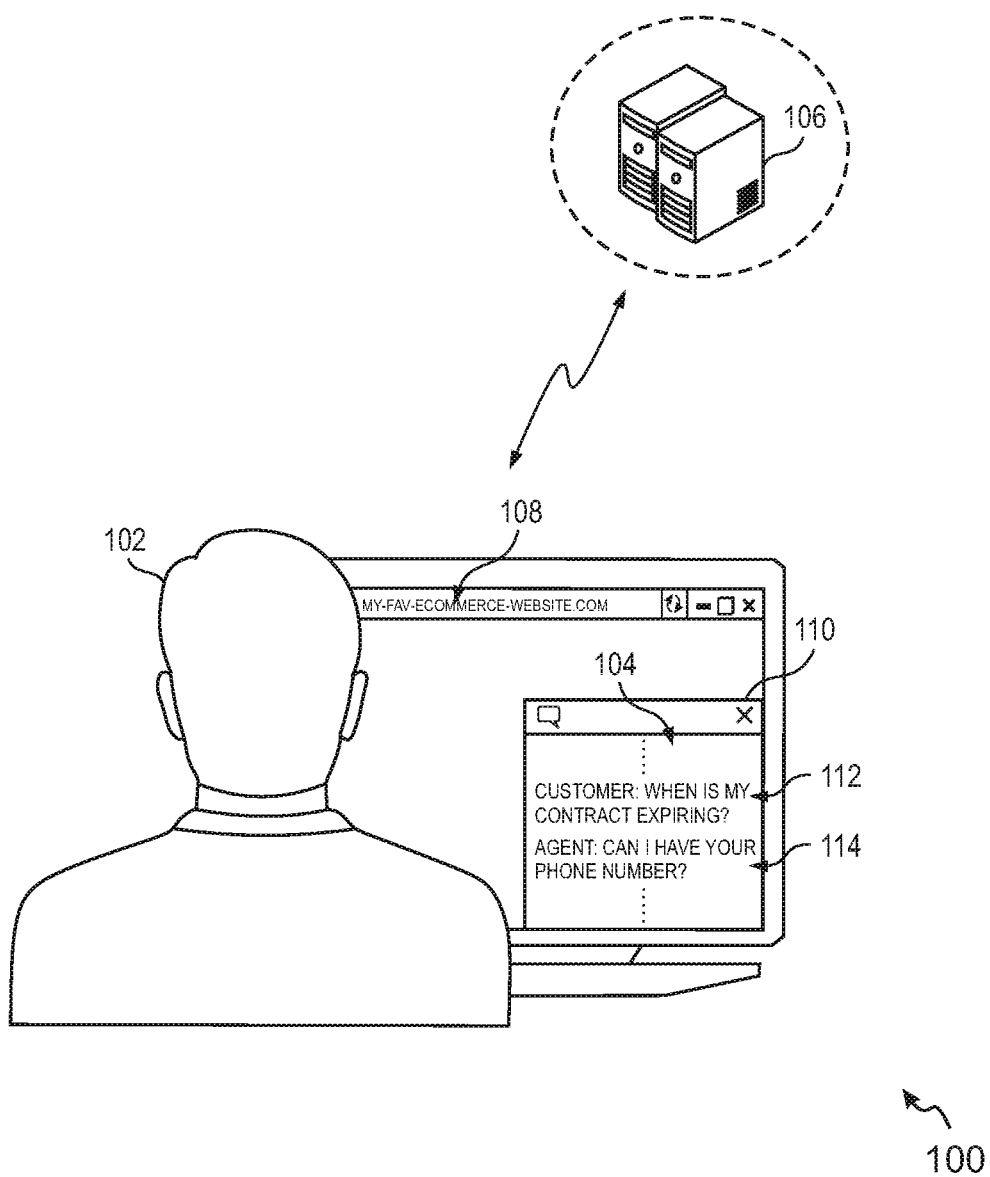
FIG. 1 shows a representation of a customer engaged in a chat conversation with an automated conversational agent in accordance with an example scenario.

FIG. 1 shows a representation 100 of a customer 102 engaged in a chat conversation 104 with an automated conversational agent 106, in accordance with an example scenario. In an illustrative example, the customer 102 may be browsing a Website 108 of an enterprise and wish to seek assistance from a customer support representative during a current visit to the enterprise Website 108. Most enterprises typically display widgets or hyperlinks on their Website, which are associated with text such as 'Let's Chat' or 'Need Assistance, Click Here!'. The customer 102 may click on the widget or the hyperlink to seek assistance. Upon receiving an input corresponding to the widget or the hyperlink, a chat console such as a chat console 110 may be displayed to the customer 102. The customer 102 may thereafter engage in a textual chat conversation with a conversational agent, such as the automated conversational agent 106, for receiving desired assistance. The automated conversational agent 106 is referred to hereinafter as a virtual agent 106.

In some example scenarios, the customer 102 may also call a customer care number (not shown in FIG. 1) displayed on the enterprise Website 108 and connect with an automated conversational agent, such as for example an interactive voice response (IVR) system, to seek assistance therefrom. The conversation may be embodied as voice conversation in such a scenario.

As an illustrative example, the customer 102 is depicted to have posed a query 112 including text 'WHEN IS MY CONTRACT EXPIRING?' to the virtual agent 106 in the chat console 110.

The query 112 may be provided as an input to a machine learning model, which is trained to generate replies to customer queries. The generation of a reply by a machine learning model in response to a customer query is explained with reference to an illustrative example in FIG. 2.

Figure 2:
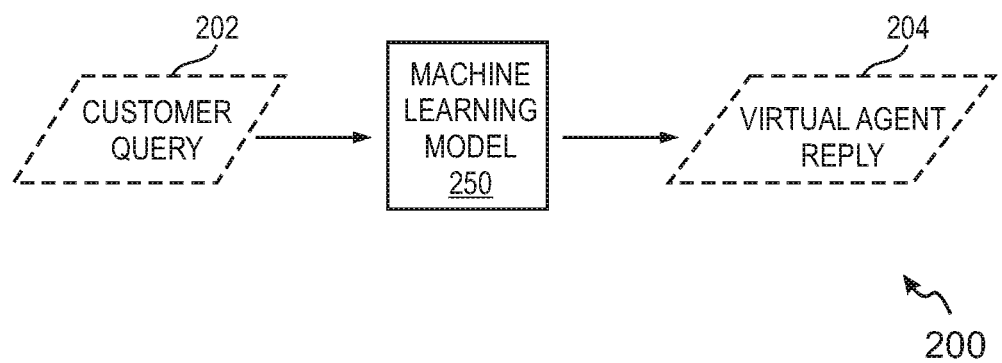
FIG. 2 shows a block diagram representation illustrating generation of a trained virtual agent reply in response to a customer query in accordance with an example scenario.

Referring now to FIG. 2, a block diagram representation 200 is shown for illustrating generation of a trained virtual agent reply in response to a customer query, in accordance with an example scenario. More specifically, the block diagram representation 200 depicts a customer query 202, such as the query 112 shown in FIG. 1, being provided as an input to a machine learning model 250. The machine learning model 250 is trained to receive customer conversational inputs and provide trained replies to the customers. Accordingly, the machine learning model 250 is configured to generate a reply, shown as a virtual agent reply 204, in response to the customer query 202. The virtual agent reply 204 may be provided to the customer as a response from the virtual agent to the customer query 202 during the turn-based interaction.

In an example scenario, the query 112 'WHEN IS MY CONTRACT EXPIRING?' may be provided to the machine learning model 250 as the customer query 202. The machine learning model 250 may be trained to generate a reply 'CAN I HAVE YOUR PHONE NUMBER?' in response to such a query. The reply is then forwarded to the virtual agent, which may then provide the reply to the customer as shown in FIG. 1.

Referring now to FIG. 1, the virtual agent reply provided to the customer is shown as reply 114 including text 'CAN I HAVE YOUR PHONE NUMBER?' in the chat console 110.

Currently, the machine learning models developed for turn-based interactions between customers and virtual agents are trained to respond to a current customer input. The conventional machine learning models fail to capture a context of the conversation or, more specifically, although a machine learning model may retain a context of the current conversational input by processing the words in the customer's conversational input in a sequential manner, the context of the previous customer conversational inputs or agent conversational inputs, i.e. previous customer or agent chat lines, in the same conversation is not taken into account by the machine learning model. Furthermore, the conventional machine learning models do not predict each word in a virtual agent reply based on the context of the conversation and instead only provide trained replies to the customers.

Various embodiments of the invention provide a method and apparatus that are capable of overcoming these and other obstacles and providing additional benefits. More specifically, various embodiments of the invention disclosed herein present techniques for facilitating turn-based interactions between agents and customers of the enterprise. A typical turn-based interaction involves multiple turns, i.e. the customer and the agent take turns while conversing during the interaction. In one embodiment, an RNN based model architecture is defined, wherein multiple turns, including customer and/or agent conversational lines, of a turn-based interaction are encoded and thereafter decoded to generate a virtual agent reply. Encoding multiple turns of the turn-based interaction enables taking into account the context of the conversation. In one embodiment, to determine the number of turns to be considered for encoding, a concept of a virtual bounding box is used, wherein the width value of the virtual bounding box enables the selection of the number of turns to be considered for encoding. For example, a width value of the virtual bounding box may be selected to be three, which results in encoding three turns, such as the current customer turn, the previous agent turn, and the previous customer turn. Each turn may be encoded using an RNN based encoder and the outputs of these encoders are passed through a set of multi-layer perceptron, i.e. an artificial neural network, to create single encoded output, which is in turn fed to an RNN based decoder to predict the virtual agent's reply.

In one embodiment, two vectors of length equal to the dimension of the vocabulary are maintained and updated at each turn that contain count of all the words typed or uttered so far: one for the customer's conversational input, and one for the agent. These vectors, also referred to herein as global vectors, are used in the decoder (in addition to the decoder output) to predict the virtual agent's reply.

The virtual agent reply generated in such a manner captures the context of the conversation and not just the context of the current conversational input. Furthermore, such an architecture facilitates prediction of each word in the virtual agent reply based on the context of the conversation instead providing a trained reply, thereby improving a quality of responses provided to the customers of the enterprise. An apparatus for facilitating turn-based interactions between customers and agents is explained with reference to FIG. 3A.

Figure 3A:
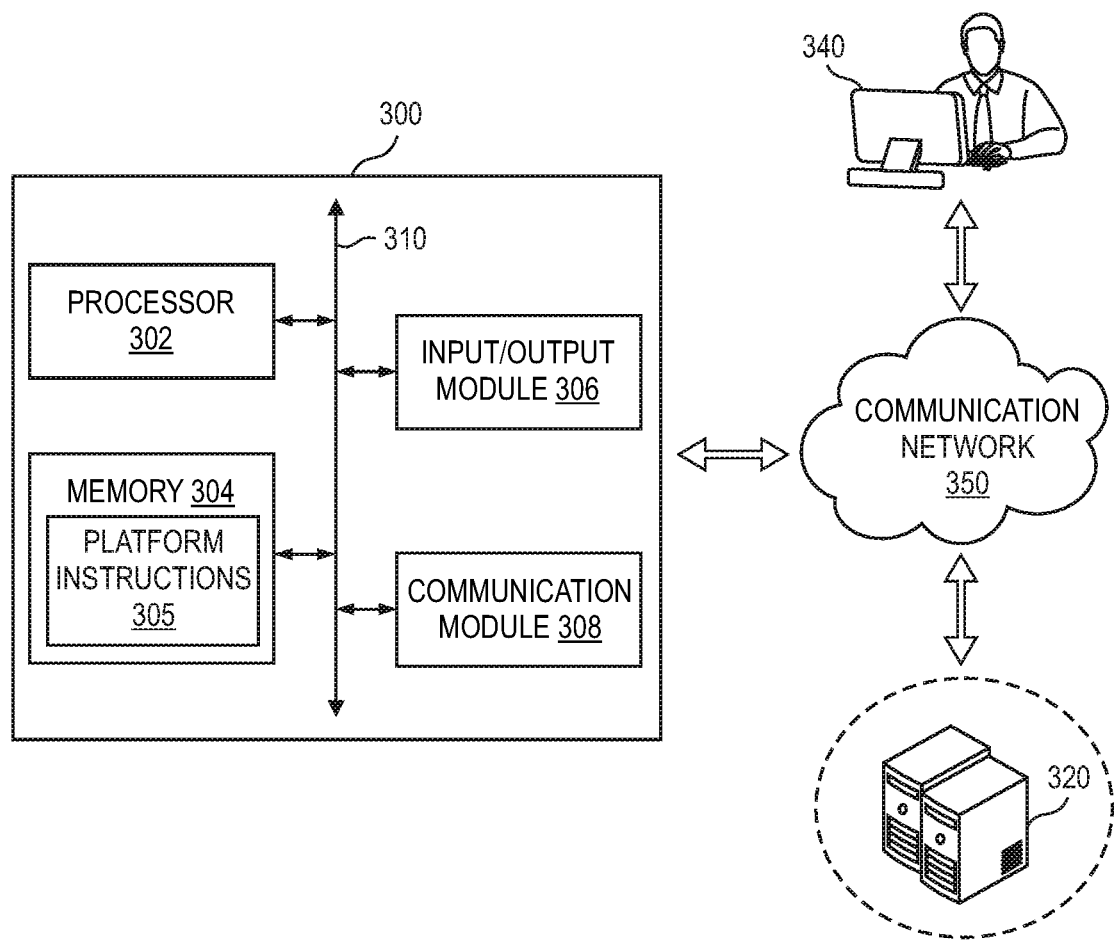
FIG. 3A shows a block diagram of an apparatus configured to facilitate turn-based interactions between agents and customers of an enterprise in accordance with an embodiment of the invention.

FIG. 3A shows a block diagram of an apparatus 300 configured to facilitate turn-based interactions between agents and customers of an enterprise, in accordance with an embodiment of the invention. The term 'agents' as used herein implies automated conversational agents. The automated conversational agents are also interchangeably referred to herein as 'virtual agents'. The term 'virtual agents' includes both 'chatbots' and 'interactive voice response (IVR) systems'. Accordingly, the virtual agent replies, as used herein, may include both typed textual replies as well as spoken utterances.

The term 'facilitating turn-based interactions' as used herein refers to facilitating prediction of each word of virtual agent replies while taking into account the context of the conversation and not just the current conversational input of the customer so as to provide high quality agent responses to the customers in turn-based interactions with the customers. The term 'conversational input' as used herein refers to a textual input or a spoken input provided by the agent or the customer during the course of the chat or a voice call interaction.

The apparatus 300 includes at least one processor, such as a processor 302 and a memory 304. Although the apparatus 300 is depicted to include only one processor, the apparatus 300 may include a greater number of processors therein. In an embodiment, the memory 304 is capable of storing machine executable instructions, referred to herein as platform instructions 305. Further, the processor 302 is capable of executing the platform instructions 305. In an embodiment, the processor 302 may be embodied as a multi-core processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 302 may be configured to execute hard-coded functionality. In an embodiment, the processor 302 is embodied as an executor of software instructions, wherein the instructions may specifically configure the processor 302 to perform the algorithms and/or operations described herein when the instructions are executed.

The memory 304 may be embodied as one or more volatile memory devices, one or more non-volatile memory devices, and/or a combination of one or more volatile memory devices and non-volatile memory devices. For example, the memory 304 may be embodied as semiconductor memories, such as mask ROM, PROM (programmable ROM), EPROM (erasable PROM), flash memory, RAM (random access memory), etc.; magnetic storage devices, such as hard disk drives, floppy disks, magnetic tapes, etc.; optical magnetic storage devices, e.g. magneto-optical disks; CD-ROM (compact disc read only memory); CD-R (compact disc recordable); CD-R/W (compact disc rewritable); DVD (Digital Versatile Disc); and BD (BLU-RAY® Disc).

The memory 304 is configured to store at least one recurrent neural network (RNN) based model. More specifically, the memory 304 is configured to include encoding logic and decoding logic for use in RNN encoding and RNN decoding, respectively. The memory 304 is also configured to store values of width of a virtual bounding box capable of being positioned over a textual representation of the turn-based interaction to capture a predefined number of conversational inputs within boundaries of the virtual bounding box, as will be explained in detail later. In at least some embodiments, the value of the width may be selected by the user of the apparatus 300 based on empirical observations or may be dynamically determined by the apparatus 300 based on learning from repository of completed interactions between customers and agents of the enterprise.

The apparatus 300 also includes an input/output module 306 (hereinafter referred to as an 'I/O module 306') and at least one communication module such as a communication module 308. In an embodiment, the I/O module 306 may include mechanisms configured to receive inputs from and provide outputs to the user of the apparatus 300. For example, the I/O module 306 may enable the user to provide selection of a value of the width of the virtual bounding box. To enable reception of inputs and provide outputs to the user of the apparatus 300, the I/O module 306 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 302 may include I/O circuitry configured to control at least some functions of one or more elements of the I/O module 306, such as, for example, a speaker, a microphone, a display, and/or the like. The processor 302 and/or the I/O circuitry may be configured to control one or more functions of the one or more elements of the I/O module 306 through computer program instructions, for example, software and/or firmware, stored on a memory, for example, the memory 304, and/or the like, accessible to the processor 302.

The communication module 308 is configured to facilitate communication between the apparatus 300 and one or more remote entities over a communication network, such as a communication network 350. For example, the communication module 308 may enable communication between the apparatus 300 and devices deployed at remote customer support centers including devices of human agents or systems configuring virtual agents for providing service and support based assistance to the customers of the enterprise. As an illustrative example, the communication module 308 is depicted to facilitate communication with a virtual agent 320 over the communication network 350.

In an embodiment, the communication module 308 may include several channel interfaces to receive information from a plurality of enterprise interaction channels. Some non-exhaustive examples of the enterprise interaction channels may include a Web channel, i.e. an enterprise Website, a voice channel, i.e. voice-based customer support, a chat channel, i.e. a chat support, a native mobile application channel, a social media channel, and the like. Each channel interface may be associated with a respective communication circuitry such as for example, a transceiver circuitry including antenna and other communication media interfaces to connect to the communication network 350. The communication circuitry associated with each channel interface may, in at least some example embodiments, enable transmission of data signals and/or reception of signals from remote network entities, such as Web servers hosting enterprise Website or a server at a customer support and service center configured to maintain real-time information related to interactions between customers and agents.

In at least one example embodiment, the channel interfaces are configured to receive up-to-date information related to the customer-agent interactions from the enterprise interaction channels. In some embodiments, the information may also be collated from the plurality of devices utilized by the customers. To that effect, the communication module 308 may be in operative communication with various customer touch points, such as electronic devices associated with the customers, Websites visited by the customers, devices used by customer support representatives, for example voice agents, chat agents, IVR systems, in-store agents, and the like, engaged by the customers and the like. As an illustrative example, the communication module 308 is depicted to be communicably associated with a customer's electronic device 340 over the communication network 350.

The communication module 308 may further be configured to receive information related to customer interactions with conversational agents, such as voice or chat interactions between customers and conversational agents, for example automated conversational agents or live agents, being conducted using various interaction channels, in real-time and provide the information to the processor 302. In at least some embodiments, the communication module 308 may include relevant Application Programming Interfaces (APIs) to communicate with remote data gathering servers associated with such enterprise interaction channels over the communication network 350. The communication network 350 may be embodied as a wired communication network, for example Ethernet, local area network (LAN), etc., a wireless communication network, for example a cellular network, a wireless LAN, etc., or a combination thereof, for example the Internet.

In an embodiment, various components of the apparatus 300, such as the processor 302, the memory 304, the I/O module 306 and the communication module 308 are configured to communicate with each other via or through a centralized circuit system 310. The centralized circuit system 310 may be various devices configured to, among other things, provide or enable communication between the components (302-308) of the apparatus 300. In certain embodiments, the centralized circuit system 310 may be a central printed circuit board (PCB) such as a motherboard, a main board, a system board, or a logic board. The centralized circuit system 310 may also, or alternatively, include other printed circuit assemblies (PCAs) or communication channel media.

The apparatus 300 as illustrated and hereinafter described is merely illustrative of an apparatus that could benefit from embodiments of the invention and, therefore, should not be taken to limit the scope of the invention. The apparatus 300 may include fewer or more components than those depicted in FIG. 3A. In an embodiment, the apparatus 300 may be implemented as a platform including a mix of existing open systems, proprietary systems and third-party systems. In another embodiment, the apparatus 300 may be implemented completely as a platform including a set of software layers on top of existing hardware systems. In an embodiment, one or more components of the apparatus 300 may be deployed in a Web Server. In another embodiment, the apparatus 300 may be a standalone component in a remote machine connected to a communication network and capable of executing a set of instructions, sequential and/or otherwise, to facilitate turn-based interactions between agents and customers of an enterprise. Moreover, the apparatus 300 may be implemented as a centralized system, or, alternatively, the various components of the apparatus 300 may be deployed in a distributed manner while being operatively coupled to each other. In an embodiment, one or more functionalities of the apparatus 300 may also be embodied as a client within devices, such as customers' devices. In another embodiment, the apparatus 300 may be a central system that is shared by or accessible to each of such devices.

In an embodiment, the processor 302 may include a plurality of modules capable of facilitating application of an RNN based model to process customer conversational inputs of a turn-based interaction and generate an appropriate virtual agent response. The modules of the processor 302 are depicted in FIG. 3B.

Figure 3B:
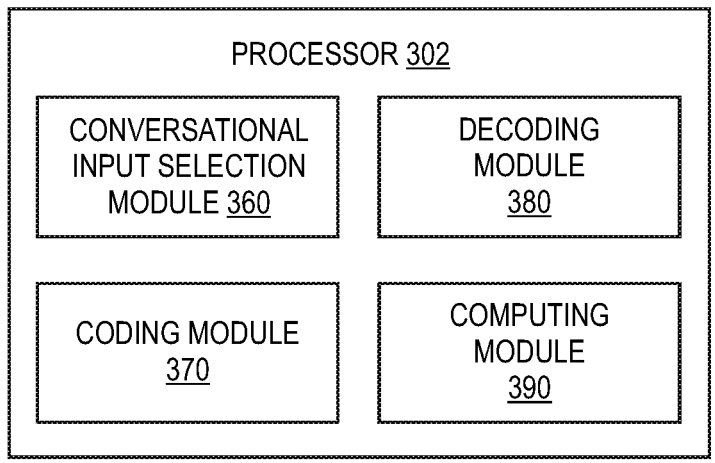
FIG. 3B shows a block diagram of a processor of the apparatus of FIG. 3A in accordance with an embodiment of the invention.

FIG. 3B shows a block diagram of the processor 302 of the apparatus 300 of FIG. 3A, in accordance with an embodiment of the invention. The processor 302 is depicted to include a conversational input selection module 360, a coding module 370, a decoding module 380 and a computing module 390. The various modules of the processor 302 may be implemented using software, hardware, firmware, or a combination thereof. In some example embodiments, the processor 302 may preclude the various modules and is configured to perform all the functions that are collectively performed by the conversational input selection module 360, the coding module 370, the decoding module 380 and the computing module 390. Various modules of the processor 302 are depicted herein for example purposes and that the processor 302 may include fewer or more modules than those depicted in FIG. 3B.

As explained above, the memory 304 is configured to store logic for one or more Recurrent Neural Network (RNN) based models, which are configured to facilitate prediction of virtual agent replies taking into account the context of the conversation. Moreover, the RNN based models are configured to predict each word in the virtual agent reply, thereby improving a quality of responses provided to the customer. The term 'predicting each word in the virtual agent's reply' as used herein implies predicting each word in an optimum reply or predicting each word that a trained human agent would have given in response to a customer's conversational input, while taking into account the context of the conversation. The terminology 'generation of words' is used interchangeably with 'prediction of words' with reference to the virtual agent's reply as the words are obtained as an output from RNN based models, as will be explained in further detail later.

Each RNN based model includes encoding logic for encoding a conversational input such as, for example, a customer chat line/utterance or a virtual agent chat line/utterance in a turn-based interaction, and decoding logic for decoding a vector input, for example a numerical value, received from the encoder to generate the virtual agent reply. The encoding logic of the RNN based model is hereinafter interchangeably referred to as an 'RNN based encoder' or 'RNN encoder', whereas the decoding logic of the RNN based model is hereinafter interchangeably referred to as an 'RNN based decoder' or 'RNN decoder'. In effect, the RNN encoder and the RNN decoder together are configured to receive one or more conversational inputs and predict each word in the virtual agent replies.

In one embodiment, for predicting a virtual agent reply to a customer's conversational input, the conversational input selection module 360 is configured to receive the current conversational input provided by the customer during the turn-based interaction. As an illustrative example, a customer's conversational input such as 'When is my contract expiring?' may be received by the conversational input selection module 360.

Further, the conversational input selection module 360 is configured to identify one or more conversational inputs exchanged between the customer and the agent prior to the current conversational input provided by the customer. In one embodiment, the one or more conversational inputs are identified from the turn-based interaction based on a predefined criterion. In an illustrative example, the predefined criterion may be a predefined number of customer conversational inputs, a predefined number of agent conversational inputs, or a predefined number of agent or customer conversational inputs.

In another illustrative example, the predefined criterion may be a number of conversational inputs that can be accommodated within a virtual bounding box of fixed width. More specifically, the conversational input selection module 360 may identify the one or more conversational inputs by positioning a virtual bounding box of fixed width over textual representation of the turn-based interaction to capture a predefined number of conversational inputs within boundaries of the virtual bounding box. The term 'virtual bounding box' as used herein implies an imaginary window of fixed width capable of being positioned over textual representation of a turn-based interaction to capture a fixed number of conversational lines. As the turn-based interaction progresses, the virtual bounding box may be slid downwards to capture a fixed number of conversational lines. An example virtual bounding box is shown in FIG. 4.

In at least one embodiment, the virtual bounding box may be positioned in such a manner that the current conversational input of the customer is placed at the bottom, i.e. the current conversational input is the last conversational input in the virtual bounding box. Thereafter, one or more conversational inputs exchanged between the customer and the agent prior to the current conversational input and which are within boundaries of the virtual bounding box are identified. The current customer's conversational input and the one or more conversational inputs identified by placing the virtual bounding box on the textual representation of the turn-based interaction configure a 'set of conversational inputs'. The conversational input selection module 360 is configured to provide the set of conversational inputs to the coding module 370 for encoding each conversational input using an RNN encoder.

The width of the virtual bounding box defines the number of conversational inputs that are selected in the set of conversational inputs. In other words, the fixed width of the virtual bounding box enables selection of a predefined number of conversational inputs to be considered for processing to predict the virtual agent's reply. In an illustrative example, the fixed width of the virtual bounding box may be set to three, thereby indicating that the predefined number of conversational inputs to be captured for prediction of virtual agent's reply is three. In such a scenario, if the virtual bounding box is placed on the textual representation of the turn-based interaction such that the current conversational input of the customer is placed at the bottom, then two more conversational inputs exchanged prior to the bottom-placed current conversational input may be included within the boundaries of the virtual bounding box because the width is fixed to be three. In such a scenario, the current conversational input from the customer and two other conversational inputs exchanged prior to the current conversational input may be selected to configure the set of conversational inputs. The width value of a virtual bounding box may be fixed either by the user of the apparatus 300 of FIG. 3A or may be generated based on learning based on the previous agent-customer turn-based interactions. The selection of the conversational inputs using the virtual bounding box is further explained with reference to FIG. 4.

Figure 4:
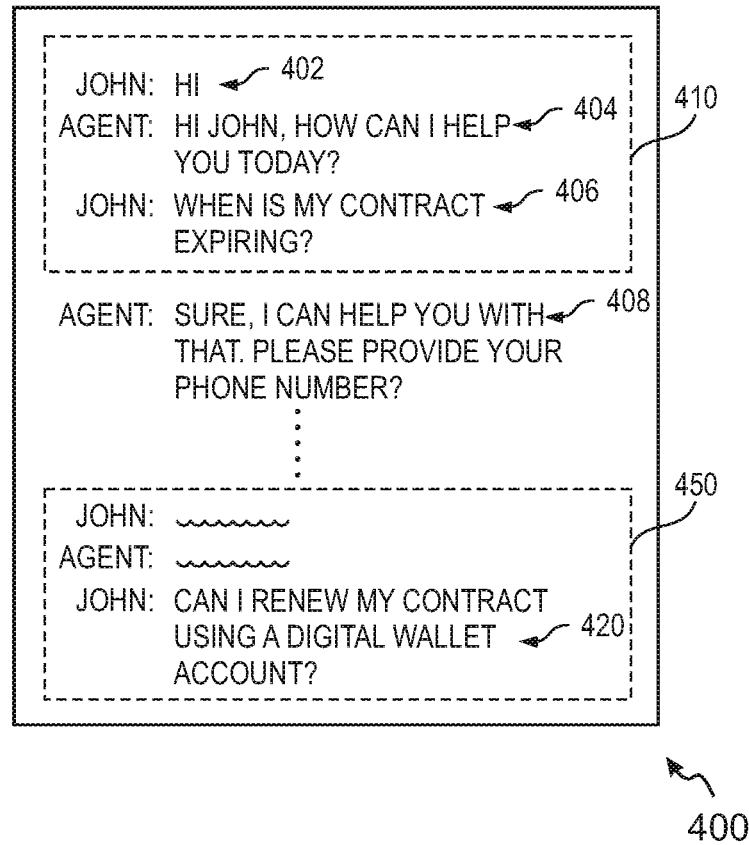
FIG. 4 shows a textual representation of an example turn-based interaction between a virtual agent and a customer illustrating a selection of a set of conversational inputs by using a fixed-width virtual bounding box in accordance with an embodiment of the invention.

FIG. 4 shows a textual representation of an example turn-based interaction 400 between a virtual agent and a customer for illustrating the selection of a set of conversational inputs by using a fixed-width virtual bounding box, in accordance with an embodiment of the invention. The virtual agent's conversational inputs are depicted to be associated with label 'AGENT' in the turn-based interaction 400, whereas the customer conversational inputs are depicted to be associated with the label 'JOHN' for illustration purposes. Further, the value of the width of the virtual bounding box is selected to be 'three' for illustration purposes.

As can be seen in FIG. 4, the customer John initiates the turn-based interaction 400 at 402 with a greeting. The virtual agent 'AGENT' is depicted to have responded with text 'HI JOHN, HOW CAN I HELP YOU TODAY?' at 404. The customer John proceeds to ask, 'WHEN IS MY CONTRACT EXPIRING?' at 406 to the virtual agent. To predict the virtual agent reply, a number of previous conversational inputs of the customer and/or the virtual agent may be selected along with the current customer conversational input by the conversational input selection module 360 (shown in FIG. 3B) for encoding purposes. As explained with reference to FIG. 3B, a virtual bounding box is used to select the set of conversations to be processed for predicting the virtual agent reply. Further, as explained with reference to FIG. 3B, the virtual bounding box may be positioned on the textual representation of the turn-based interaction in such a manner that the current conversational input of the customer is placed at the bottom, i.e. the current conversational input is the last conversational input in the virtual bounding box. As an illustrative example, a virtual bounding box is depicted to be placed at position 410 in FIG. 4. The virtual bounding box is positioned on the textual representation of the turn-based interaction 400 in such a manner that the current conversational input of the customer John, i.e. conversational input 406 is the last conversational input within the boundaries of the virtual bounding box. Thereafter, conversational inputs exchanged between the customer John and the virtual agent prior to the current conversational input at 406 and which are within boundaries of the virtual bounding box are identified. More specifically, the customer's conversational input at 402 and the agent's conversational input at 404 are identified. The customer's conversational input at 406 and 402 and the virtual agent's conversational input at 404, i.e. the conversational inputs within the boundaries of the virtual bounding box at position 410, configure the set of conversational inputs. The width value for the virtual bounding box is selected to be three and, as a result, the number of conversational inputs selected for encoding is three.

Each of the three conversational inputs is provided to the coding module 370, which generates a context vector representation for the corresponding input. In at least one embodiment, the context vector representation corresponds of a numerical value of fixed length, for example 100 to 200 digits. The vector representations are thereafter used to generate the virtual agent reply, as will be explained in detail later. As an example, the predicted virtual agent reply is depicted to be 'SURE I CAN HELP YOU WITH THAT. PLEASE PROVIDE YOUR PHONE NUMBER?' at 408. The virtual bounding box has a fixed width and as the conversation proceeds, the virtual bounding box slides to select the relevant conversational inputs for encoding purposes. For example, the customer John is depicted to have asked if he can renew the contract using a digital wallet account at 420. The virtual agent reply to such a customer input may be predicted based on encoding the conversational input of the customer, i.e. input 420, along with two previous conversational inputs in the turn-based interaction 400 as per the position of the virtual bounding box at 450. To summarize, for the predetermined width value of the virtual bounding box selected as three, three conversational inputs in the turn-based interaction 400 are selected for predicting each virtual agent reply.

Referring now to FIG. 3B, the set of conversational inputs selected by the conversational input selection module 360 is provided to the coding module 370. The coding module 370 is configured to execute commands to retrieve encoding logic associated with the RNN based model from the memory 304. The encoding logic associated with the RNN based model configures in effect an 'RNN encoder'. The commands executed by the coding module 370 to retrieve the encoding logic from the memory 304 may equal the number of conversational inputs selected for encoding purpose. For example, if three conversational inputs are to be encoded, three commands for the encoding logic may be executed by the coding module 370, in effect configuring a stack of three RNN encoders with each RNN encoder configured to encode one conversational input from among the three selected conversational inputs configuring the set of conversational inputs.

In an illustrative example, for predicting the $K^{th}$ virtual agent reply, the $K^{th}$ customer conversational input, the $K-1^{th}$ virtual agent conversational input and the $K-1^{th}$ customer conversational input in the turn-based interaction may be selected by the conversational input selection module 360 and provisioned to the three RNN encoders of the coding module 370. Similarly, for predicting the $K+1^{th}$ virtual agent reply, the K+1th customer conversational input, the $K^{th}$ virtual agent conversational input and the $K^{th}$ customer conversational input may be selected by the conversational input selection module 360 and provided to the three RNN encoders of the coding module 370.

The words in a customer conversational input are sequentially fed to the RNN encoder to generate a context vector representation of the current conversational input. Similarly, context vector representations for other previous conversational inputs may be generated using respective RNN encoders. In an embodiment, the coding module 370 is further configured to call encoding logic for a multi-layer perceptron (referred to herein as the first artificial neural network or first ANN) from the memory 304 and provide the context vector representations of the stack of RNN encoders to the first ANN. The first ANN is capable of applying weights learned from previous processing of conversational inputs to the individual encoded outputs of the RNN encoders to generate a final encoded output. For example, the context vector representation corresponding to the current conversational input may be assigned the highest weightage, whereas the context vector representation corresponding to the earliest conversational input may be assigned the lowest weightage, and so on and so forth. The final encoded output from the first ANN is referred to hereinafter as 'input vector'. The input vector is then provided to the decoding module 380 (shown in FIG. 3B).

In at least one embodiment, the decoding module 380 is configured to execute a command to retrieve decoding logic associated with the RNN based model stored in the memory 304. The decoding logic associated with the RNN based model configures, in effect, an 'RNN decoder'. The RNN decoder is configured to receive the input vector from the coding module 370 and generate a decoded output, also referred to herein as 'output vector'. In an embodiment, a stream of vectors (or numbers) configuring the input vector may be sequentially fed to the decoding module 380. The decoding module 380 is configured to decode each vector to generate a stream of decoded vectors configuring the 'output vector'.

The decoding module 380 is further configured to execute a command to retrieve decoding logic (referred to herein as the second ANN) for generating word representations from the decoded vectors. The word representations from the second ANN configure the virtual agent reply, which is then provided using the communication module 308 to the virtual agent. The prediction of the virtual agent reply using the above-mentioned RNN based model is further explained with reference to FIGS. 5A-5C.

Figure 5A:
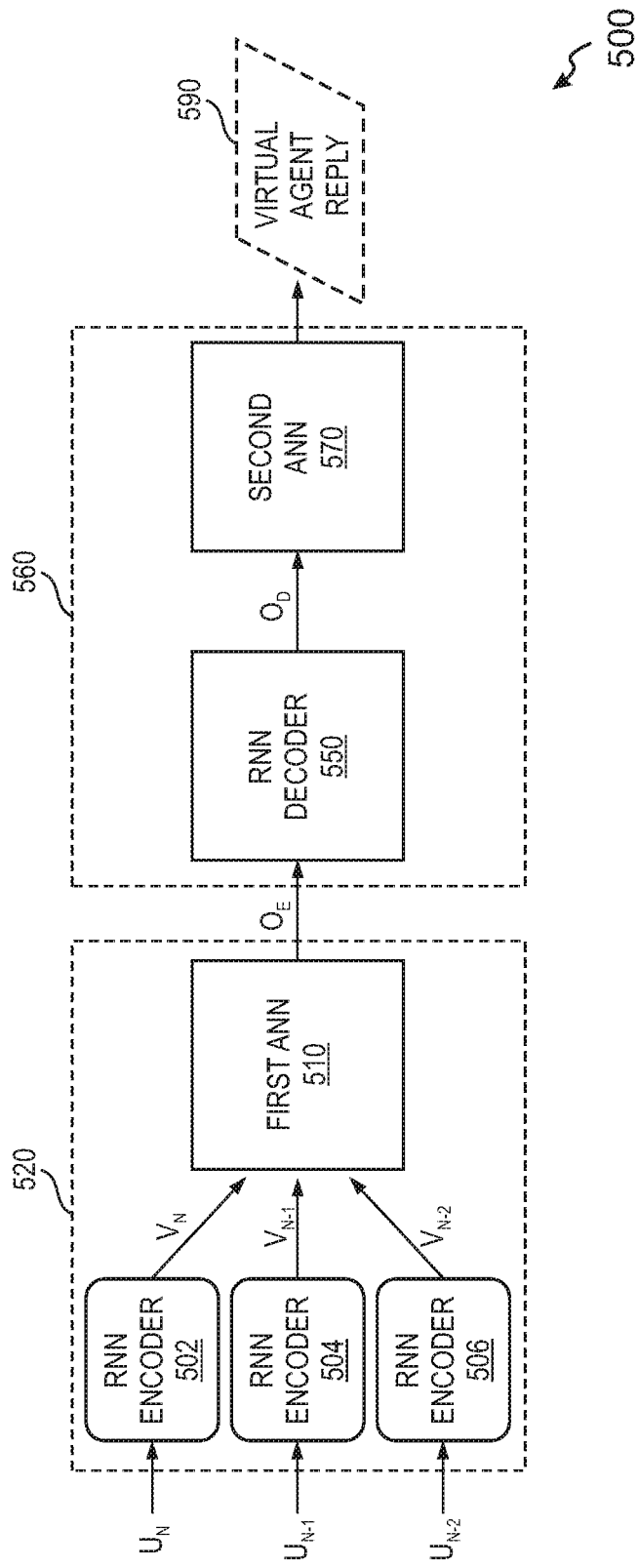
FIG. 5A shows a simplified block-diagram representation of an architecture of an RNN model for facilitating a turn-based interaction between an agent and a customer of an enterprise in accordance with an embodiment of the invention.

FIG. 5A shows a simplified block-diagram representation 500 of an architecture of an RNN model for facilitating a turn-based interaction between an agent and a customer of an enterprise in accordance with an example embodiment.

The representation 500 depicts three conversational inputs provided as inputs to three RNN encoders. Three RNN encoders are shown herein for illustration purposes and that the number of RNN encoders may vary as per the selection of virtual bounding box width value. For example, the width value of virtual bounding box may be selected to be any number greater than 1 and, accordingly, number of RNN encoders employed for encoding conversational inputs may also be any number greater than 1.

As explained with reference to FIGS. 3B and 4, the conversational input selection module 360 is configured to select the set of conversational inputs from an ongoing turn-based interaction between a virtual agent and a customer based on the width value of the virtual bounding box. Further, the set of conversational inputs may be provided to the coding module 370. More specifically, each RNN encoder, i.e. RNN encoding logic, in the coding module 370 is configured to receive one conversational input as an input and generate a context vector representation by encoding the conversational input. Each word in the conversational input may be sequentially fed to the RNN encoder to generate a numerical value, which serves as a context vector representation of the conversational input. The generation of context vector representation is explained with an illustrative example in FIG. 5B.

Figure 5B:
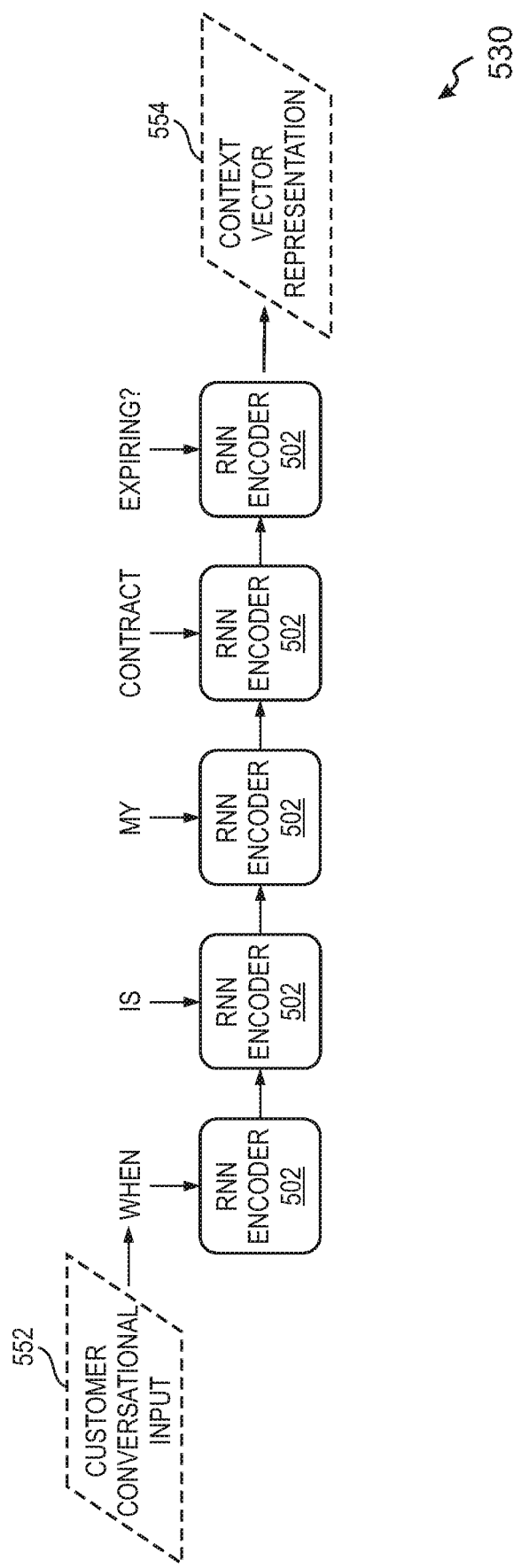
FIG. 5B shows a block diagram representation for illustrating generation of a context vector representation in accordance with an embodiment of the invention.

Referring now to FIG. 5B, a block diagram representation 530 is shown for illustrating generation of a context vector representation in accordance with an embodiment of the invention. As explained with reference to FIG. 3A, the RNN based model includes encoding logic and decoding logic. The encoding logic is used to encode, or in other words, generate a context vector representation, for example a numerical value of fixed length, for each word sequentially fed to the encoding logic.

The encoding logic is exemplarily represented using block 502, referred to hereinafter as an 'RNN Encoder 502'. As can be seen the words of a customer conversational input 552, i.e. words 'When', 'is', 'my', 'contract' and 'expiring?' are sequentially provided to the RNN encoder 502.

The multiple RNN encoders are shown to be arranged in a pipeline manner for illustration purposes. Only one RNN encoder 502 typically receives the words one after another. After each word passes through the RNN encoder 502, a vector is generated. The vector or the numerical value is indicative of the state of the RNN, i.e. a network of neurons sparsely connected by synapses, representing all words that have been provided to the RNN encoder 502 so far. The next word changes the state of the RNN, which corresponds to another vector. When all the words in the customer conversational input 552 are sequentially provided to the RNN encoder 502, the final output which is shown as 'context vector representation 554' represents the state of the RNN encoder 502 upon being sequentially provided all the words in the customer conversational input 552.

Referring back to FIG. 5A, in an example embodiment, the current customer conversational input may be provided to one RNN encoder, the latest agent conversational input may be provided to the second RNN encoder and the previous customer conversational input may be provided to the third RNN encoder. Accordingly, the RNN encoder 502 is depicted to receive the current customer conversational input $U_N$, the RNN encoder 504 is depicted to receive the latest agent conversational input $U_{N-1}$ and the RNN encoder 506 is depicted to receive the previous customer conversational input $U_{N-2}$. The context vector representations generated as output by the RNN encoders 502, 504, and 506 are depicted to be $V_N$, $V_{N-1}$, and $V_{N-2}$, respectively. The context vector representations are depicted to be provided to a first Artificial Neural Network (ANN) 510, i.e. multi-layer perceptron logic retrieved by the coding module 370. The first ANN 510 is configured to receive the context vector representations generated as output by the RNN encoders 502-506 and generate a final encoded output, referred to hereinafter as input vector $O_E$. A dotted block 520 is shown in FIG. 5A to illustrate the processing performed by the coding module 370 of the apparatus 300.

The final encoded output, i.e. input vector $O_E$ is provided to the decoding module 380. More specifically, the input vector $O_E$ is provided to an RNN decoder 550, which is configured to generate a decoded output, referred to hereinafter as output vector $O_D$. The output vector $O_D$ is provided to a second Artificial Neural Network (ANN) 570 configured to generate a word for each decoded output received from the RNN decoder 550, thereby generating the words configuring a virtual agent reply 590. The processing performed by the decoding module 380 is shown using a dotted block 560 in FIG. 5A. The processing of the input vector $O_E$ by the decoding module, i.e. the RNN decoder 550 and the second ANN 570, to generate each word in the virtual agent reply 590 is exemplarily depicted in FIG. 5C.

Figure 5C:
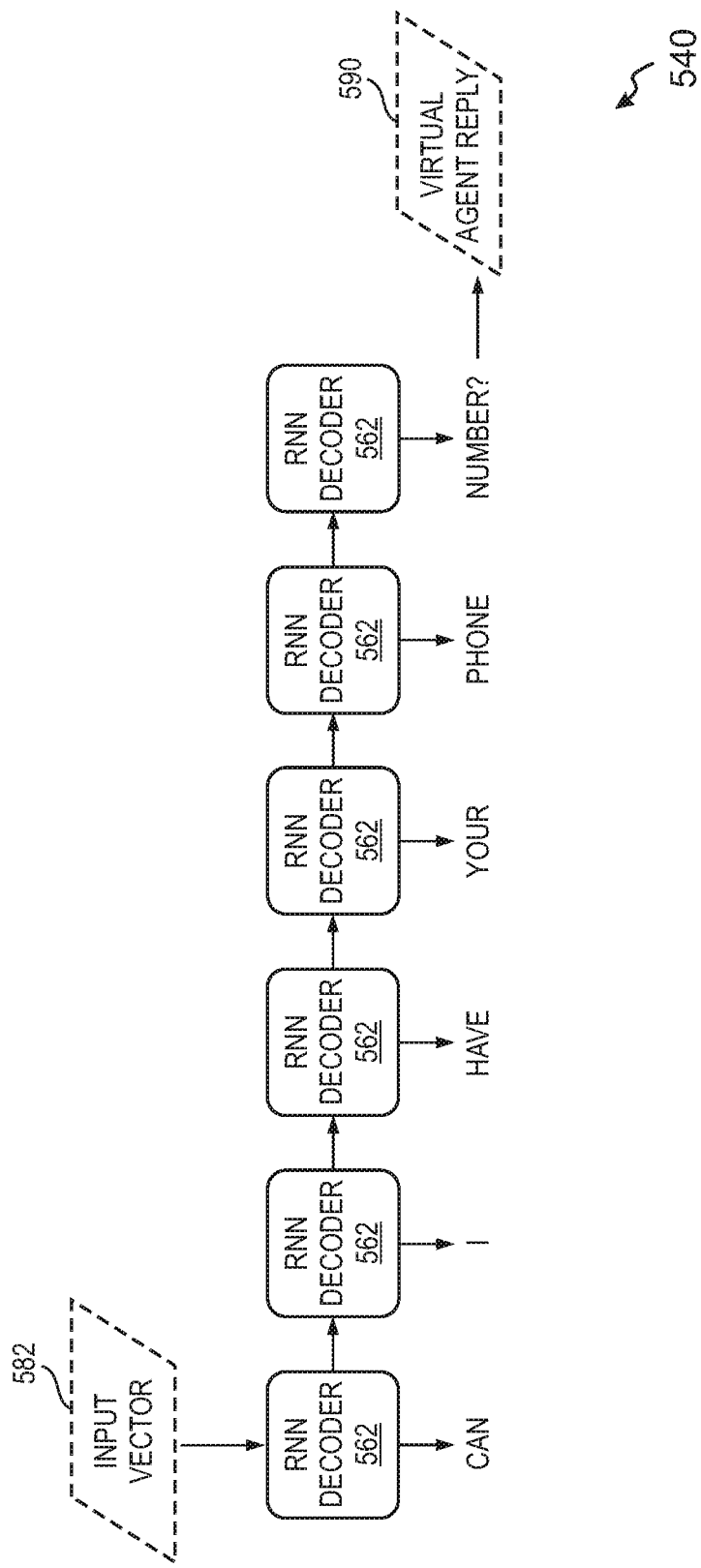
FIG. 5C shows a block diagram representation for illustrating generation of each word in the virtual agent reply in accordance with an embodiment of the invention.

Referring now to FIG. 5C, a block diagram representation 540 is shown for illustrating generation of each word in the virtual agent reply 590 in accordance with an embodiment of the invention. As explained with reference to FIG. 3A, the RNN based model includes encoding logic and decoding logic. The decoding logic is used to decode, or in other words, generate a word response, more specifically a numerical vector representing a probability distribution over the vocabulary, for each word sequentially fed to the decoding logic.

The decoding logic of the decoding module 380, i.e. the RNN decoder 550 and the second ANN 570, is exemplarily represented using block 562, referred to hereinafter as an 'RNN decoder 562'. As shown, the input vector $O_E$ (shown as input vector 582) is provided to the RNN decoder 562, which provides a vector representation configuring the first word of the virtual agent reply 590, shown as 'Can'. The word is provisioned to the RNN decoder 562 to generate the second word 'I' and so on and so forth to generate the sequential output of words configuring the virtual agent reply 590: 'CAN I HAVE YOUR PHONE NUMBER?' The response is then provided to the virtual agent. More specifically, decoding logic, i.e. the RNN decoder 562, of the decoding module 380 is configured to provide the virtual agent reply 590 to the communication module 308 (shown in FIG. 3A), which is configured to forward the virtual agent reply 590 to the virtual agent. The virtual agent may then provide the virtual agent reply 590 to the customer as a reply to the customer's conversational input. The prediction of each word in the virtual agent reply 590 by encoding and decoding several conversational inputs in the turn-based interaction improves a quality of responses provided to the customer.

Referring now to FIG. 3B, in at least one example embodiment, the computing module 390 is configured to track unique words dynamically in both customer's conversational inputs and agent's conversational inputs. Further, a count is maintained for each unique word, such that if a unique word is subsequently used by the customer or the agent in their respective conversational inputs, then the count of that word is incremented by the number of times, the usage of the word is repeated. Furthermore, the computing module 390 is configured to generate a vector representation, referred to hereinafter as first global vector, using the unique words in the customer's conversational inputs and their respective counts. Similarly, the computing module 390 is configured to generate a vector representation, referred to hereinafter as a second global vector, using the unique words in the agent's conversational inputs. The lengths of the global vectors are equal to the dimensions of a predefined vocabulary. The words used in the customer and agent conversational inputs are indicative of the progression of the turn-based interaction between the agent and the customer, whereas the count of the unique words provides the depth of the usage of the unique words. Together, the unique words and their counts facilitate retention of the context of the turn-based interaction as captured by the first global vector and the second global vector.

Figure 6:
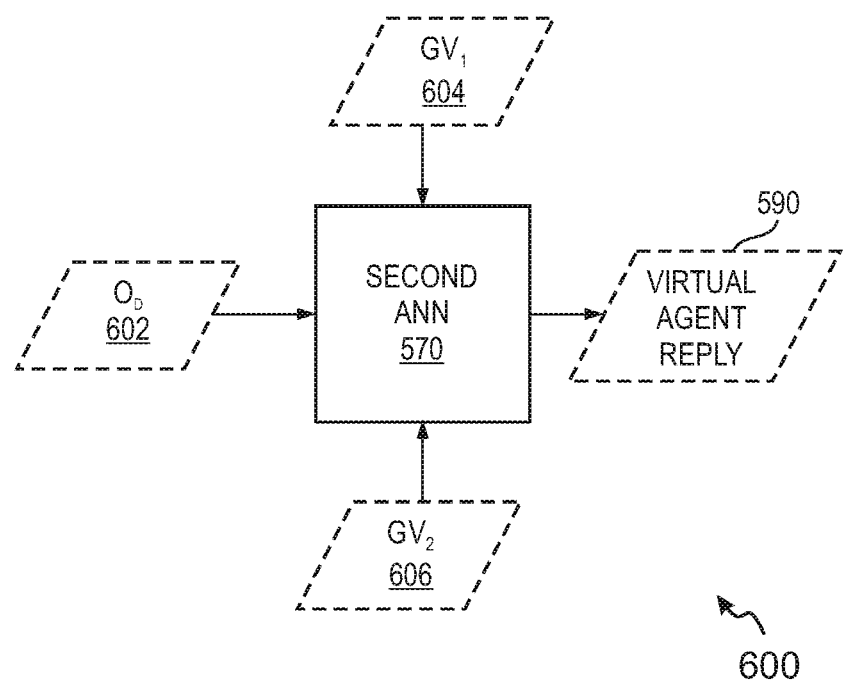
FIG. 6 shows a representation of a portion of the RNN model of FIG. 5A for illustrating generation of words configuring a virtual agent reply by providing a first global vector and a second global vector to a second ANN in accordance with an embodiment of the invention.

In at least one example embodiment, in the addition to providing the second ANN 570 (shown in FIG. 5A) the decoded output from the RNN decoder 550 i.e. the output vector $O_D$, the first global vector and the second global vector are also provided to the second ANN 570 to generate the word predictions as exemplarily depicted in FIG. 6.

Referring now to FIG. 6, a representation 600 of a portion of the RNN model 500 of FIG. 5A is shown for illustrating generation of the words configuring the virtual agent reply 590 by providing the first global vector and the second global vector to the second ANN 570 in accordance with an embodiment of the invention. As explained with reference to FIG. 5A, the one or more conversational inputs from the turn-based interaction between the customer and the virtual agent are individually encoded using RNN encoders, such as the RNN encoders 502, 504 and 506 shown in FIG. 5A. The encoded outputs of the RNN encoders, i.e. the context vector representations, are provided to an artificial neural network, such as the first ANN 510, which generates the final encoded, i.e. input vector $O_E$. The input vector $O_E$ configures the vector representation of the conversational inputs relevant for generating the virtual agent reply 590. The input vector $O_E$ is provided to the RNN decoder 550 (shown in FIG. 5A). The output of the RNN decoder 550, i.e. the output vector $O_D$, is provided to the second ANN 570 to generate the words configuring the virtual agent reply 590. However, in addition to the providing of the output vector $O_D$ shown as an output vector 602, the second ANN 570 is also provided with the first global vector, i.e. a vector generated from unique words in customer conversational inputs and shown as $GV_1$ 604, and the second global vector, i.e. a vector generated from unique words in agent conversational inputs and shown as $GV_2$ 606. The second ANN 570 is configured to receive the three vector representations corresponding to the decoded output $O_D$ and the first global vector and the second global vector to generate the words configuring the virtual agent reply 590. In at least one example embodiment, the processor 302 may be configured to provide the virtual agent reply 590 to the communication module 308, which may provide the virtual agent reply 590 to the virtual agent to facilitate turn-based interaction between the virtual agent and the customer.

Referring now to FIG. 3B, in at least one example embodiment, the computing module 390 is also configured to determine relative weightage of words in a current conversational input and their distance, i.e. a degree of similarity, with the final decoded output i.e. input vector $O_D$. In an illustrative example, a current conversational input of a customer may include ten words. When each word is fed to the RNN encoder, such as the RNN encoder 502, a corresponding vector is generated as output. For example, the ten words may be associated with ten vector representations, $h_1$, $h_2$ to $h_{10}$. The vector $h_{10}$ corresponds to the final encoded output, i.e. the context vector representation 554, or more specifically, it represents the state of the RNN encoder when all ten words of the current conversational input are passed through the RNN encoder. The vector $h_{10}$ may be provisioned to the RNN decoder, which generates the decoded output, i.e. the output vector $O_D$. A distance metric between each of the vector representations of each word $h_1$, $h_2$ to $h_{10}$ and the decoded output $O_D$ may be computed to determine the relative weightage of each of the words in the current conversational input. For example, the distance between the vector $h_1$ and $O_D$ may be at, which corresponds to the relative weightage of the first word. Similarly, distance between vector $h_2$ and $O_D$ may be $\alpha_2$ and so on and so forth until the distance between vector $h_{10}$ and $O_D$ may be $\alpha_{10}$. The sum of all the relative weightages, i.e. $\alpha_1$ to $\alpha_{10}$, is 1. In at least one example embodiment, an attention metric "Fix" may be computed using equation 1 as stated below:

$$H_x = \Sigma_j h_j \alpha_j \qquad \text{Equation 1}$$

The attention metric $H_x$ includes the sum of vector representation of each word in a conversational input along with corresponding weightage. In at least one example embodiment, in the addition to providing the second ANN 570 (shown in FIG. 5) the decoded output of the RNN decoder 550, i.e. the output vector $O_D$, the attention metric is also provisioned to the second ANN 570 to generate the word predictions as exemplarily depicted in FIG. 7.

Figure 7:
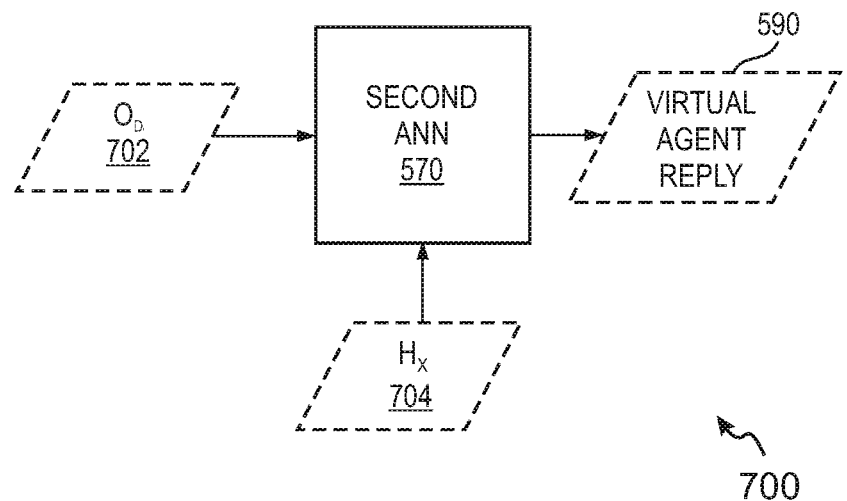
FIG. 7 shows a representation of a portion of the RNN model of FIG. 5A for illustrating the provisioning of an attention metric to the second ANN to generate the words configuring the virtual agent reply in accordance with an embodiment of the invention.

Referring now to FIG. 7, a representation 700 of a portion of the RNN model of FIG. 5A is shown for illustrating the providing of the attention metric to the second ANN 570 to generate the words configuring the virtual agent reply 590 in accordance with an embodiment of the invention. As explained with reference to FIG. 5A, the output of the RNN decoder 550, i.e. the output vector $O_D$, is provided to the second ANN 570 to generate the words configuring the virtual agent reply 590. However, in addition to the providing the output vector $O_D$ shown as $O_D$ 702, the second ANN 570 is also provided with the attention metric, shown as '$H_x$' 704. The second ANN 570 is configured to receive the two vector representations corresponding to the output vector $O_D$ 702 and the attention metric $H_x$ 704 to generate the words configuring the virtual agent reply 590. In at least one example embodiment, the processor 302 may be configured to provide the virtual agent reply to the communication module 308, which may provision the virtual agent reply to the virtual agent to facilitate turn-based interaction between the virtual agent and the customer.

Although facilitating of turn-based interactions is explained with reference to one virtual agent reply to a customer's conversational input, the apparatus 300 or, more specifically the processor 302 is configured to facilitate a providing of virtual agent replies to one or more subsequent conversational inputs of the customer during the turn-based interaction in a similar manner as explained with reference to FIGS. 3A to 7. More specifically, the virtual agent replies may be provided in response to the one or more subsequent conversational inputs based on generation of context vector representations corresponding to respective conversational inputs.

A method for facilitating turn-based interactions between virtual agents and customers of the enterprise is explained next with reference to FIG. 8.

Figure 8:
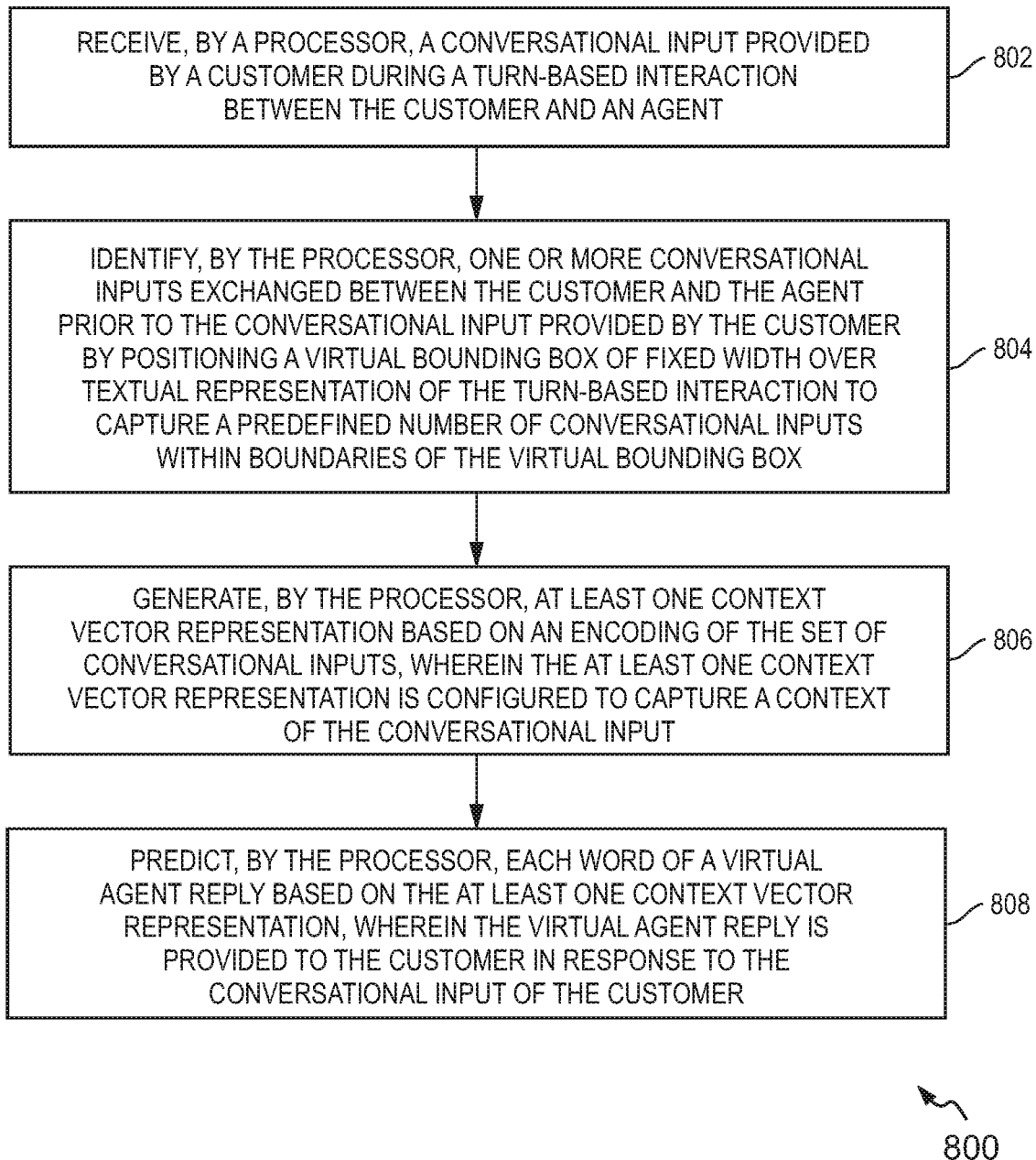
FIG. 8 shows a flow diagram of a method for facilitating a turn-based interaction between an agent and a customer of an enterprise in accordance with an embodiment of the invention.

FIG. 8 shows a flow diagram of a method 800 for facilitating turn-based interaction between an agent and a customer of an enterprise in accordance with an embodiment of the invention. The method 800 depicted in the flow diagram may be executed by, for example, the apparatus 300 explained with reference to FIG. 3A to 7. Operations of the flowchart, and combinations of operation in the flowchart, may be implemented by, for example, hardware, firmware, a processor, circuitry and/or a different device associated with the execution of software that includes one or more computer program instructions. The operations of the method 800 are described herein with help of the apparatus 300. It is noted that, the operations of the method 800 can be described and/or practiced by using any system other than the apparatus 300. The method 800 starts at operation 802.

At operation 802 of the method 800, a conversational input provided by the customer during a turn-based interaction between the customer and the agent is received by a processor, such as the processor 302 of the apparatus 300. As explained with reference to FIG. 1, a customer of an enterprise may initiate an interaction with an agent, such as a virtual agent for various reasons. The interaction may be initiated in form of a chat interaction or a voice interaction. For example, the customer may initiate a chat interaction with the virtual agent on an enterprise Website or initiate a voice interaction with an interactive voice response (IVR) by calling a customer care number. The apparatus 300 on account of being in operative communication with servers deployed at the customer support centers may receive the content of the conversation, for example textual chat lines or transcripts of conversational inputs exchanged during the turn-based interaction in substantially real-time. A 'turn-based interaction' between a customer and a virtual agent corresponds to an interaction in which the customer and the virtual agent take turns in exchanging conversational inputs. Accordingly, one such conversational input provided by a customer during an ongoing turn-based interaction is received by the processor, such as the processor 302 of the apparatus 300.

At operation 804 of the method 800, one or more conversational inputs exchanged between the customer and the agent prior to the conversational input provided by the customer are identified. The one or more conversational inputs are identified by positioning a virtual bounding box of fixed width over textual representation of the turn-based interaction to capture a predefined number of conversational inputs within boundaries of the virtual bounding box. The term 'virtual bounding box' as used herein implies an imaginary window of fixed width capable of being positioned over textual representation of a turn-based interaction to capture a fixed number of conversational lines. As the turn-based interaction progresses, the virtual bounding box may be slid downwards to capture a fixed number of conversational lines. An example virtual bounding box is explained with reference to FIG. 4.

In at least one embodiment, the virtual bounding box may be positioned in such a manner that the current conversational input of the customer is placed at the bottom, i.e. the current conversational input is the last conversational input in the virtual bounding box. Thereafter, one or more conversational inputs exchanged between the customer and the agent prior to the current conversational input and which are within boundaries of the virtual bounding box are identified. The current customer's conversational input and the one or more conversational inputs identified by placing the virtual bounding box on the textual representation of the turn-based interaction configure a set of conversational inputs. The selection of the conversational inputs may be performed as explained to FIG. 4 and is not explained herein.

At operation 806 of the method 800, at least one context vector representation is generated based on an encoding of the set of conversational inputs. The at least one context vector representation is configured to capture a context of the conversational input. In one embodiment, the encoding of the set of conversational inputs includes encoding each conversational input from among the set of conversational inputs using a recurrent neural network (RNN) based encoder to generate corresponding context vector representations. In an illustrative example, for predicting the $K^{th}$ virtual agent reply, the $K^{th}$ customer conversational input, the $K-1^{th}$ virtual agent conversational input and the K−1th customer conversational input in the turn-based interaction are selected and provisioned to the three RNN encoders. The generation of the context vector representation may be performed as explained with reference to FIG. 5B and is not explained again herein. The context vector representations are configured to capture a context of the conversational input.

At operation 808 of the method 800, each word of a virtual agent reply is predicted based on the at least one context vector representation. In one embodiment, the context vector representations generated from encoding each conversational input are provided as an input to a first artificial neural network (ANN). The first ANN is capable of applying weights learnt from previous processing of conversational inputs to the individual encoded outputs of the RNN encoders to generate a final encoded output. The final encoded output is referred to hereinafter as 'input vector'.

In one embodiment, the input vector is decoded using an RNN based decoder to generate an output vector. The output vector is provided as an input to a second ANN along with a first global vector and a second global vector to a second ANN to cause prediction of the each word of the virtual agent reply. The first global vector corresponds to a vector generated by dynamically tracking a number of unique words in a plurality of conversational inputs provided by the customer. Similarly, the second global vector corresponds to a vector generated by dynamically tracking a number of unique words in a plurality of conversational inputs provided by the virtual agent. The second ANN is configured to receive the three vector representations corresponding to the output vector and the first global vector and the second global vector to generate the words configuring the virtual agent reply.

In one embodiment, a sub-vector is generated corresponding to each word in a conversational input when each word is encoded using the RNN encoder. In one embodiment, the sub-vector is compared with the context vector representation of the corresponding conversational input to determine relative weightage of the corresponding word. Further, an attention metric for each word is generated based on the sub-vector and the relative weightage as explained with reference to FIG. 7. In one embodiment, the attention metric and the output vector are provided as an input to the second ANN to cause prediction of the each word of the virtual agent reply.

In at least one example embodiment, the virtual agent reply is provided to the virtual agent to facilitate turn-based interaction between the customer and the agent. The virtual agent reply is thereafter provided by the virtual agent to the customer in response to the conversational input of the customer. The method 800 ends at 808.

Various embodiments disclosed herein provide numerous advantages. The techniques disclosed herein suggest techniques for facilitating turn-based interactions between virtual agents and customers of an enterprise. The techniques disclosed herein suggest encoding multiple turns of the turn-based interaction using a modified RNN architecture. Encoding multiple turns enables taking into account the context of the conversation while determining the appropriate virtual agent reply to the customer's conversational input. The virtual agent response generated in such a manner captures the context of the conversation and not just the context of the current conversational input, as configured by the context vector representation for the current conversational input. Furthermore, such an architecture facilitates prediction of each word in the virtual agent reply based on the context of the conversation instead providing a trained reply, thereby improving a quality of responses provided to the customers of the enterprise.

Various embodiments described above may be implemented in software, hardware, application logic, or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an apparatus, as described and depicted in FIG. 3A. A computer-readable medium may include a computer-readable storage medium that may be any media or means that can contain or store the instructions for use by or in connection with an instruction execution system, system, or device, such as a computer.

Although the invention has been described with reference to specific exemplary embodiments, various modifications and changes may be made to these embodiments without departing from the broad spirit and scope of the present invention. For example, the various operations, blocks, etc., described herein may be enabled and operated using hardware circuitry, for example complementary metal oxide semiconductor (CMOS) based logic circuitry; and firmware, software, and/or any combination of hardware, firmware, and/or software, for example embodied in a machine-readable medium. For example, the apparatus and method may be embodied using transistors, logic gates, and electrical circuits, for example application specific integrated circuit (ASIC) circuitry and/or in Digital Signal Processor (DSP) circuitry.

Particularly, the apparatus 300 and its various components, such as the processor 302, the memory 304, the I/O module 306, the communication module 308, and the centralized circuit system 310 may be enabled using software and/or using transistors, logic gates, and electrical circuits, for example integrated circuit circuitry such as ASIC circuitry. Various embodiments of the invention may include one or more computer programs stored or otherwise embodied on a computer-readable medium, wherein the computer programs are configured to cause a processor or computer to perform one or more operations, for example operations explained herein with reference to FIG. 8. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media, such as floppy disks, magnetic tapes, hard disk drives, etc.; optical magnetic storage media, e.g., magneto-optical disks; CD-ROM (compact disc read only memory), CD-R (compact disc recordable), CD-R/W (compact disc rewritable), DVD (Digital Versatile Disc), BD (Blu-ray (registered trademark) Disc); and semiconductor memories, such as mask ROM, PROM (programmable ROM), EPROM (erasable PROM), flash ROM, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line, e.g. electric wires and optical fibers, or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the Claims.

The invention claimed is:

1. A computer-implemented method for facilitating a turn-based interaction between an agent and a customer, comprising:

receiving, by a processor, a conversational input provided by the customer during the turn-based interaction between the customer and the agent;

identifying, by the processor, one or more conversational inputs exchanged between the customer and the agent prior to the conversational input provided by the customer;

identifying the one or more conversational inputs positioning a virtual bounding box of fixed width over textual representation of the turn-based interaction to capture a predefined number of conversational inputs within boundaries of the virtual bounding box;

positioning the virtual bounding box capture the conversational input of the customer as a last conversational input in the virtual bounding box to facilitate identification of the one or more conversational inputs exchanged between the customer and the agent prior to the conversational input;

using the conversational input and the one or more conversational inputs to configure a set of conversational inputs;

generating, by the processor, at least one context vector representation based on an encoding of the set of conversational inputs;

configuring the at least one context vector representation to capture a context of the conversational input;

predicting, by the processor, each word of a virtual agent reply based on the at least one context vector representation; and providing the virtual agent reply to the customer in response to the conversational input of the customer.

2. The method of claim 1, further comprising:
facilitating, by the processor, a providing of virtual agent replies to one or more subsequent conversational inputs of the customer during the turn-based interaction, the virtual agent replies provided based on generation of context vector representations corresponding to respective conversational inputs from among the one or more subsequent conversational inputs.

3. The method of claim 1, wherein the encoding of the set of conversational inputs comprises encoding each conversational input from among the set of conversational inputs using an Recurrent Neural Network (RNN) based encoder to generate corresponding context vector representations.

4. The method of claim 3, further comprising:
providing the context vector representations as an input to a first artificial neural network (ANN) to cause generation of an input vector.

5. The method of claim 4, further comprising:
configuring the first ANN to assign weights to each context vector representation from among the context vector representations prior to processing the input for generating the input vector.

6. The method of claim 5, further comprising:
decoding the input vector using an RNN based decoder to generate an output vector.

7. The method of claim 6, further comprising:
dynamically tracking, by the processor, a number of unique words in a plurality of conversational inputs provided by the customer to generate a first global vector; and
dynamically tracking, by the processor, a number of unique words in a plurality of conversational inputs provided by the agent to generate a second global vector.

8. The method of claim 7, further comprising:
providing, by the processor, the first global vector, the second global vector and the output vector as an input to a second ANN to cause prediction of each word of the virtual agent reply.

9. The method of claim 6, further comprising:
encoding each conversational input by sequentially providing each word in each conversational input to the RNN based encoder; and
generating a sub-vector corresponding to each word subsequent to the encoding of the each word.

10. The method of claim 9, further comprising:
comparing, by the processor, the sub-vector with the input vector to determine relative weightage of corresponding word;
generating, by the processor, an attention metric for each word based on the sub-vector and the relative weightage; and
providing, by the processor, the attention metric and the output vector as an input to a second ANN to cause prediction of each word of the virtual agent reply.

11. An apparatus for facilitating turn-based interactions between agents and customers, comprising:
a memory for storing instructions; and
a processor configured to execute the instructions and cause the apparatus to at least:

receive a conversational input provided by a customer during a turn-based interaction between the customer and an agent;
identify one or more conversational inputs exchanged between the customer and the agent prior to the conversational input provided by the customer;
identify the one or more conversational inputs by positioning a virtual bounding box of fixed width over textual representation of the turn-based interaction to capture a predefined number of conversational inputs within boundaries of the virtual bounding box;
position the virtual bounding box to capture the conversational input of the customer as a last conversational input in the virtual bounding box to facilitate identification of the one or more conversational inputs exchanged between the customer and the agent prior to the conversational input;
use the conversational input and the one or more conversational inputs to configure a set of conversational inputs;
generate at least one context vector representation based on an encoding of the set of conversational inputs;
configure the at least one context vector representation to capture a context of the conversational input;
predict each word of a virtual agent reply based on the at least one context vector representation; and
provide the virtual agent reply to the customer in response to the conversational input of the customer.

12. The apparatus of claim 11, wherein the apparatus is further caused to:
facilitate a providing of virtual agent replies to one or more subsequent conversational inputs of the customer during the turn-based interaction, the virtual agent replies provided based on generation of context vector representations corresponding to respective conversational inputs from among the one or more subsequent conversational inputs.

13. The apparatus of claim 11, wherein the apparatus is further caused to:
encode the set of conversational inputs by encoding each conversational input from among the set of conversational inputs using an Recurrent Neural Network (RNN) based encoder to generate corresponding context vector representations.

14. The apparatus of claim 13, wherein the apparatus is further caused to:
provide the context vector representations as an input to a first artificial neural network (ANN) to cause generation of an input vector; and
configure the first ANN to assign weights to each context vector representation from among the context vector representations prior to processing the input for generating the input vector.

15. The apparatus of claim 14, wherein the apparatus is further caused to:
decode the input vector using an RNN based decoder to generate an output vector.

16. The apparatus of claim 15, wherein the apparatus is further caused to:
dynamically track a number of unique words in a plurality of conversational inputs provided by the customer to generate a first global vector;
dynamically track a number of unique words in a plurality of conversational inputs provided by the agent to generate a second global vector; and provide the first global vector, the second global vector and the output vector as an input to a second ANN to cause prediction of each word of the virtual agent reply.

17. The apparatus of claim 15, wherein the apparatus is further caused to:
encode each conversational input by sequentially providing each word in each conversational input to the RNN based encoder; and wherein a sub-vector is generated corresponding to each word subsequent to the encoding of the each word.

18. The apparatus of claim 17, wherein the apparatus is further caused to:
compare the sub-vector with the input vector to determine relative weightage of corresponding word;
generate an attention metric for each word based on the sub-vector and the relative weightage; and
provide the attention metric and the output vector as an input to a second ANN to cause prediction of each word of the virtual agent reply.

19. A computer-implemented method for facilitating a turn-based interaction between a virtual agent and a customer, comprising:
receiving, by a processor, a conversational input provided by the customer during the turn-based interaction between the customer and the virtual agent;
identifying, by the processor, one or more conversational inputs from the turn-based interaction based on a predefined criterion;
exchanging the one or more conversational inputs between the customer and the virtual agent prior to the conversational input provided by the customer;
using the conversational input and the one or more conversational inputs to configure a set of conversational inputs;
generating, by the processor, at least one context vector representation based on an encoding of the set of conversational inputs using a recurrent neural network (RNN) based encoder;
configuring the at least one context vector representation to capture a context of the conversational input;
predicting, by the processor, each word of a virtual agent reply based on the at least one context vector representation; and
providing the virtual agent reply to the customer in response to the conversational input of the customer.

20. The method of claim 19, further comprising:
facilitating, by the processor, a defining of a virtual bounding box of fixed width;
positioning the virtual bounding box over a textual representation of the turn-based interaction to capture a predefined number of conversational inputs;
identifying the one or more conversational inputs based on the predefined criterion by identifying conversational inputs from the turn-based interaction that are capable of being accommodated in the virtual bounding box when the virtual bounding box is positioned to include the conversational input of the customer as a last conversational input in the virtual bounding box.

* * * * *